Patented Aug. 2, 1927.

1,637,510

UNITED STATES PATENT OFFICE.

GELLERT ALLEMAN, OF SWARTHMORE, PENNSYLVANIA, ASSIGNOR TO SUN OIL COMPANY, OF PHILADELPHIA, PENNSYLVANIA, A CORPORATION OF NEW JERSEY.

MINERAL-OIL DERIVATIVE AND PROCESS OF MAKING SAME.

No Drawing. Application filed February 6, 1924. Serial No. 691,023.

The object of my invention is to produce, from crude petroleum, novel products, free from mineral oil, adapted for many useful purposes. All of these products may be characterized as metallic derivatives, in that they are prepared by the addition, to oil-free fatty acid soap, derived from mineral oil, of metallic salts.

In order to produce these derivatives, it is first essential to extract from the crude petroleum, the oil-free fatty acid soap. To do this I start with the alkali precipitate or soda sludge resulting from the treatment, with caustic soda or other alkali, of acid-treated lubricating stock. A typical composition comprises fatty acid soap, 11.6%; inert material similar to fossil resins, 17.1%; sodium sulfate, 2.3%; mineral oil, 46%; water, 23%. To this composition I add water until the water content is approximately fifty-eight per cent. I then heat the composition to a steam pressure of about sixty pounds for about two hours, and cool it while applying compressed air under pressure of about sixty pounds. The oil separates out as a top layer. The soap and resin solution is concentrated, by evaporating some of the water, and is then cooled in order to separate the soap and resin from the sodium sulfate. The separation begins to take place at about 5° C., and is hastened by lower temperatures. It is found that the soap and resin which first separates has a higher resin content than that which separates finally. This suggests that the resin is less soluble than the soap. The soap and resin solidify to a pasty mass. The sodium sulfate remains in solution in the water. After separating the sodium sulfate solution therefrom, the pasty mass remaining is entirely free from mineral oil and sodium sulfate.

The process is described with more particularity in an application filed by me February 6, 1924, Serial No. 691,022.

To this soap and resin composition I have added certain water-soluble metallic salts (of calcium, barium, zinc, lead, manganese, copper, chromium, cobalt, nickel and magnesium) and have prepared therefrom metallic derivatives having certain characteristics in common which make them adaptable for the manufacture of the same or similar useful products. Each of these metallic derivatives has also characteristics peculiar to itself which make it particularly adaptable to the manufacture of certain products.

With the exception of the magnesium derivative, all of the metallic derivatives are almost or quite insoluble in water. They may be said, therefore, to be substantially insoluble in water.

The fatty acid obtained from breaking down the oil-free soap will have an acid number very much lower than that which it would have if it were pure, that is, destitute of the petroleum resins, and the acid value is a more or less variable factor. In preparing the derivatives hereinafter described, an acid number of 85, which is typical, may be assumed.

In preparing the calcium derivative, I proceed as follows:

1 kg. of anhydrous oil-free soap of the character of that hereinbefore described is dissolved in about 4 liters of cold water. 85 gms. of anhydrous calcium chloride are dissolved in about 500 cc. of water. While stirring the soap solution, the solution of calcium chloride is added gradually. The calcium derivative of the soap separates out as a light colored, extremely sticky, tenacious mass. In consistency it suggests taffy. The sticky mass, which flows at a temperature of about 60° F., is next washed with cold water, during which process it is agitated by means of a mechanical stirrer or by means of air. The mechanical stirrer seems to be more desirable for this purpose, as fine fibres of the calcium derivative are pulled through the water, thus gaining greater surface for washing. After washing with water, it may be partly dried by the application of heat.

While the calcium derivative is insoluble in water, it is very soluble or miscible in ethyl acetate, carbon tetrachloride, gasoline, benzene and ether. It is slightly soluble or miscible in linseed oil and turpentine, and is difficultly soluble in ethyl alcohol, methyl alcohol, and acetone.

Unless heated, the calcium derivative will not dry on long exposure to the air, but remain sticky. When mixed with calcium carbonate, it forms a non-drying, non-hardening, putty-like mass which sticks to glass, wood or iron with great tenacity. This tenacity is much greater than in the case of ordinary putty. Since this non-drying putty-like substance will stick to glass and iron, and accommodates itself without cracking to the differences in volume due to the contraction by cold and the expansion by heat of iron window sashes, this mixture will not break the glass as does ordinary putty.

Among other uses to which the calcium derivative is applicable may be mentioned:

As a non-drying adhesive for insulating electric tape.

For application to fly paper.

Waterproofing cement foundations or walls by dissolving it in gasoline, applying it to the cement or walls, and allowing the gasoline to evaporate, or by placing it directly on paper, which it impregnates, placing this impregnated paper on the cement wall and affixing the paper to the cement wall by the addition of a layer of cement on the outside of the impregnated paper.

As waterproofing material for tents, boats, etc.

As a wood filler when dissolved in an appropriate solvent.

As a colorless varnish when dissolved in linseed oil or other solvents. A drying agent must be added for this purpose.

As a powerful adhesive for glass plates, flexible magazine backs and leather, and for placing linoleum on wooden or cement floors.

As a tree girdle for protection against climbing insects.

As an elastic grafting wax.

As hard enamel on the surface of iron and other metals, by dissolving in a suitable solvent, placing on clean metal, and baking at a temperature at which it will not decompose.

The barium derivative may be prepared in a similar manner to that employed in making the calcium derivative, by employing barium chloride, or any other water soluble salt of barium.

It requires 185 gm. of $BaCl_2.2H_2O$ to treat 1 kg. of the oil-free soap. The barium derivative is slightly darker in color than the calcium derivative, and is similar in physical properties to it. It is, however, more soluble in turpentine than is the calcium derivative. It can be used for the same purposes as the calcium derivative. It possesses no marked advantage over the calcium derivative, and is more expensive. It is probably superior to the calcium derivative when employed in connection with the manufacture of color lakes, as hereinafter described.

The zinc derivative may be made from the oil-free soap by treating 1 kg. of the oil-free soap with 218 gm. of $ZnSO_4.7H_2O$. It possesses many of the physical properties of the calcium and barium derivatives, but is differentiated by the fact that it is very soluble in acetone. It is darker in color than either the calcium derivative or the barium derivative, and is extremely adhesive. It can be used for surgical dressings, in which case it may be spread on cloth. It can also be used as a substitute for antiphlogistine or other ointments of a similar nature. When mixed with toluene dichloramine, it possesses very decided antiseptic properties. It can also be used as a substitute for pigments in ordinary paints.

The lead derivative is made by adding 251 gm. of $Pb(NO_3)_2$ (dissolved in water) to 1 kg. of the oil-free soap. Its color is about the same as the color of the calcium derivative, and its solubility is similar. It possesses great adhesive properties, and may be used as a surgical dressing. It can also be used as a substitute for the pigments employed in lead paints. It possesses one marked difference from the other derivatives, in that it hardens on standing in air. It may also be employed as an anti-knock material in gasoline.

The manganese derivative is prepared by adding 169 gm. of $MnSO_4.4H_2O$ to 1 kg. of the oil-free soap. It is of a mahogany color, and hardens on exposure to air.

The copper derivative is made by adding 190 gm. of $CuSO_4.5H_2O$ to 1 kg. of the oil-free soap. When dry, this is a very dark green, but in thin layers its color resembles that of the mineral malachite. It can be used as a paint.

The chromium derivative is made by adding 304 gm. of $Cr(NO_3)_3.9H_2O$ to 1 kg. of the oil-free soap. When dry, its color is similar to that of chrome green, and may be substituted for chrome green in the manufacture of paints.

The cobalt derivative is made by adding 214 gm. of $Co(NO_3)_2.6H_2O$ to 1 kg. of the oil-free soap. It is purple in color when dry, and can be employed in the manufacture of paints.

The nickel derivative is made by adding 213 gm. of $NiSO_4.7H_2O$ to 1 kg. of the oil-free soap. In thin layers it is apple green. It can be employed as a pigment in the manufacture of paints.

Certain of these metallic derivatives are particularly adaptable to the manufacture of color lakes. Thus, red, blue, and yellow color lakes are made by dissolving the appropriate dyestuff in water, adding it to the oil-free soap, and then adding the required amount of calcium or barium salt to exactly precipitate the lake. These calcium and barium lakes are soluble in practically the same solvents as the calcium and barium derivatives. The lakes can be employed in the manufacture of varnishes, colored paints, lithographic and colored printing inks, and wall paper inks. Salts other than those of barium and calcium may be used to precipitate the color lakes, but the color indicated for calcium and barium may not be the same color when other salts are used in precipitating the lakes. Salts of barium and calcium give better colors and give more desirable physical properties to the color lakes than when other salts are used. In dyeing cloth by means of fluorescin, an aluminum salt gives a red color and a tin salt a blue color.

I have not herein specified all the metallic derivatives which may be prepared from the described oil-free fatty acids. It will be understood that various water-soluble salts of each metal may be substituted for the salts specified. It would be impossible to make an exhaustive statement of the useful purposes for which these metallic derivatives may be used, but the uses specified are suggestive of the wide range of utility possessed by these derivatives.

I do not herein claim the process herein described of separating the mineral oil from the fatty acid soap and resinous material, nor the product of such process, the same forming the subject of an application filed February 6, 1924, Serial No. 691,022; nor do I herein claim the process herein described of making color lakes from petroleum, the same forming the subject-matter of an application filed August 24, 1926, Serial No. 131,311.

Having now fully described my invention, what I claim and desire to protect by Letters Patent is:

1. The process of manufacturing metallic derivatives from petroleum which comprises obtaining from petroleum a composition containing a water soluble fatty acid soap and resinous material having characteristics of the precipitate resulting from the treatment with an alkali of acid-treated mineral oil, but free from mineral oil, adding thereto a water soluble metal salt in amount sufficient to exchange the metallic ion of the added salt for the metallic ion of the water soluble soap, separating out as a sticky mass the metallic derivative, and washing out the other reaction products.

2. The process of manufacturing metallic derivatives from petroleum which comprises obtaining from petroleum a composition containing a water soluble fatty acid soap and resinous material having characteristics of the precipitate resulting from the treatment with an alkali of acid-treated mineral oil, but free from mineral oil, dissolving the soap in water, dissolving a water-soluble metal salt in water, adding the metal salt solution to the soap solution in amount sufficient to exchange the metallic ion of the added salt for the metallic ion of the water soluble soap, and separating out the metallic derivative.

3. The process of manufacturing metallic derivatives from the precipitate resulting from the treatment with an alkali of an acid-treated mineral oil lubricating stock, said precipitate containing a water soluble fatty acid soap, mineral oil and resinous material, which comprises eliminating the mineral oil from the other specified ingredients, adding to said other specified ingredients a solution of a metal salt to effect an exchange of the metallic ion of the added salt for the metallic ion of the water soluble soap, and separating out the metallic derivative.

4. The process of manufacturing metallic derivatives from petroleum which comprises adding water to a water soluble fatty acid soap and resinous material containing mineral oil emulsified therewith, subjecting to heat and pressure and cooling under pressure, thereby separating the mineral oil, removing the mineral oil, adding a water soluble metal salt to the fatty acid soap and resinous material to effect an exchange of the metallic ion of the added salt for the metallic ion of the water soluble soap, and separating out the metallic derivative.

In testimony of which invention, I have hereunto set my hand, at Swarthmore, Penna., on this 31st day of January, 1924.

GELLERT ALLEMAN.